(12) United States Patent
Cochcroft, Jr. et al.

(10) Patent No.: US 6,292,860 B1
(45) Date of Patent: Sep. 18, 2001

(54) METHOD FOR PREVENTING DEADLOCK BY SUSPENDING OPERATION OF PROCESSORS, BRIDGES, AND DEVICES

(75) Inventors: Arthur F. Cochcroft, Jr., West Columbia, SC (US); Edward A. McDonald, Baton Rouge, LA (US); Byron L. Reams, Lexington, SC (US); Harry W. Scrivener; Bobby W. Batchler, both of Columbia, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/991,697

(22) Filed: Dec. 16, 1997

(51) Int. Cl.[7] ................................................. G06F 13/00
(52) U.S. Cl. ...................... 710/108; 710/101; 710/129; 710/113; 710/126; 710/200; 709/210; 711/151
(58) Field of Search .................................. 710/101, 108, 710/200, 129, 113, 126; 709/210; 711/151

(56) References Cited

U.S. PATENT DOCUMENTS

| 4,965,719 | 10/1990 | Shoens et al. ......................... 364/200 |
| 4,984,153 | 1/1991 | Kregness et al. ..................... 364/200 |
| 5,339,427 | 8/1994 | Elko et al. ........................... 395/725 |
| 5,408,629 | 4/1995 | Tsuchiya et al. ..................... 395/425 |
| 5,535,365 | 7/1996 | Barriuso et al. ...................... 395/482 |
| 5,625,779 | * 4/1997 | Solomon et al. ..................... 710/113 |
| 5,717,876 | * 2/1998 | Robertson ........................... 710/129 |
| 5,734,846 | * 3/1998 | Robertson ........................... 710/113 |
| 5,778,235 | * 7/1998 | Robertson ........................... 710/240 |
| 5,787,486 | * 7/1998 | Chin et al. .......................... 711/163 |
| 6,047,316 | * 4/2000 | Barton et al. ........................ 709/216 |

* cited by examiner

Primary Examiner—Rupal Dharia
(74) Attorney, Agent, or Firm—Gregory A. Welte

(57) ABSTRACT

A deadlock-avoidance system for a computer. In a multi-bus, multi-processor computer, one processor may request a lock on a bus, to execute a locked cycle, thereby blocking all other processors, and other agents, from access to the bus. In addition, a conflicting agent may, in effect, lock a resource which is needed by the processor to complete the cycle for which the lock was requested. These two locks can create a deadlock situation which stalls the computer: the processor and the conflicting agent have each locked a resource needed by the other. Under the invention, when a locked cycle is requested by a processor, all other operations are suspended in the computer. Then queues standing in memory controllers are emptied. If a process requested by an agent occupies a resource, such as a bridge, required by the requested locked cycle, that resource is freed. Then the locked cycle is executed.

13 Claims, 4 Drawing Sheets

METHOD FOR PREVENTING DEADLOCK BY SUSPENDING OPERATION OF PROCESSORS, BRIDGES, AND DEVICES

The invention concerns a system for preventing deadlocks in computers. Deadlocks can occur when a first agent, such as a processor, locks a resource needed by a second agent, and the second agent locks a resource, such as a bridge, needed by the first agent.

BACKGROUND OF THE INVENTION

FIG. 1 illustrates a bus 3 in a computer (not shown). Processors P1–P4 have access to the bus 3. A memory controller C1 is connected to the bus 3, and controls traffic to, and from, memory M1. Bridges B1-BN are also connected to the bus 3. Each bridge, in effect, acts as an adaptor circuit which allows the bus 3 to communicate with another type of bus (not shown), which can connect to a source or repository of data, such as memory, or a peripheral.

Sometimes a processor P, such as processor P1, will impose a "lock" on the bus 3, by activating lock line L. The lock prevents all other agents, such as the other processors P2–P4, and the bridges B, from gaining access to the bus 3. The lock allows the processor P1 to perform a sequence of operations on memory, without interference by the other processors or the bridges.

As a simple example, processor P1 may (1) impose the lock, (2) read the data stored at memory address X, (3) modify the data read, (4) write the modified data to address X, and (5) release the lock.

If the lock were not imposed in step (1), then, immediately after processor P1 read the data at address X, another processor, such as P2, may read the same data. Then, after the processor P1 replaced the data with the modified data in step (4), the replaced data may be inconsistent with that held by processor P2. A data coherency problem would arise: the data held by processor P2 would not be an accurate copy of data at address X. The lock prevents this problem from occurring.

In a multi-bus system, the situation becomes more complex. FIG. 2 illustrates busses BA, BB, and BC. Processors P1–P4 are connected to bus BA. Processors P5–P8 are connected to bus BC. Bridges B1–BN are connected to bus BB. Controllers C1 and C2 control traffic to, and from, memories M1 and M2, respectively.

One problem which can arise in this system is that a program may run on processor P1 which writes words outside memory M1, such as to memory M2, through bus BC. However, processor P1 has no effective way to issue a lock on bus BC. This inability to lock bus BC can create the data coherency problem described in the Background of the Invention, because another agent can read, or write, data at an address in memory M2 which is being altered by processor P1.

Another problem can arise. Assume that processor P1 issues a lock, and that P1's operations, which follow the lock, involve writing a word through bridge B1, to a memory address on the "other side" 6 of bridge B1.

Assume also that, independent of processor P1's activities, (1) an agent A1 posts a write operation which requires involvement of bridge B1 for completion, and that (2) this write operation involves a data address which processor P1 had previously cached. Consequently, for this posted write operation to proceed, the cached data must be merged with the data posted by the agent, and then returned to memory. Then the posted write operation can proceed.

Now, a deadlock has occurred. Under the rules of operation, once processor P1 has issued the lock, processor P1 must be allowed to finish its intended steps. It cannot be disrupted by the merging operation of the cached data, described immediately above. Thus, the request of agent A1 is blocked.

However, processor P1 needs bridge B1. But, under other rules of operation, bridge B1 has become irrevocably involved in the write operation posted by agent A1. In effect, bridge B1 has become a "one-way street" running in the direction of the write operation of agent A1. This direction is opposite the direction required by processor P1.

P1 has blocked the merging needed by A1, and A1 has blocked the bridge needed by P1. No further action can be taken, and the system has become stalled, or deadlocked.

OBJECTS OF THE INVENTION

An object of the invention is to provide an improved multi-bus computer system.

A further object of the invention is to provide a system for preventing deadlocks in a multi-bus computer system.

SUMMARY OF THE INVENTION

In one form of the invention, when a processor calls for a locked cycle, activity of other processors and bridges within the computer is halted. Queues in memory controllers are emptied. The locked cycle is then attempted. If the attempt is blocked by a bridge which is pre-occupied, then the queue in that bridge, perhaps together with queues in other bridges, are emptied. The locked cycle is again attempted, and now should succeed.

DETAILED DESCRIPTION OF THE INVENTION

Figure 1:
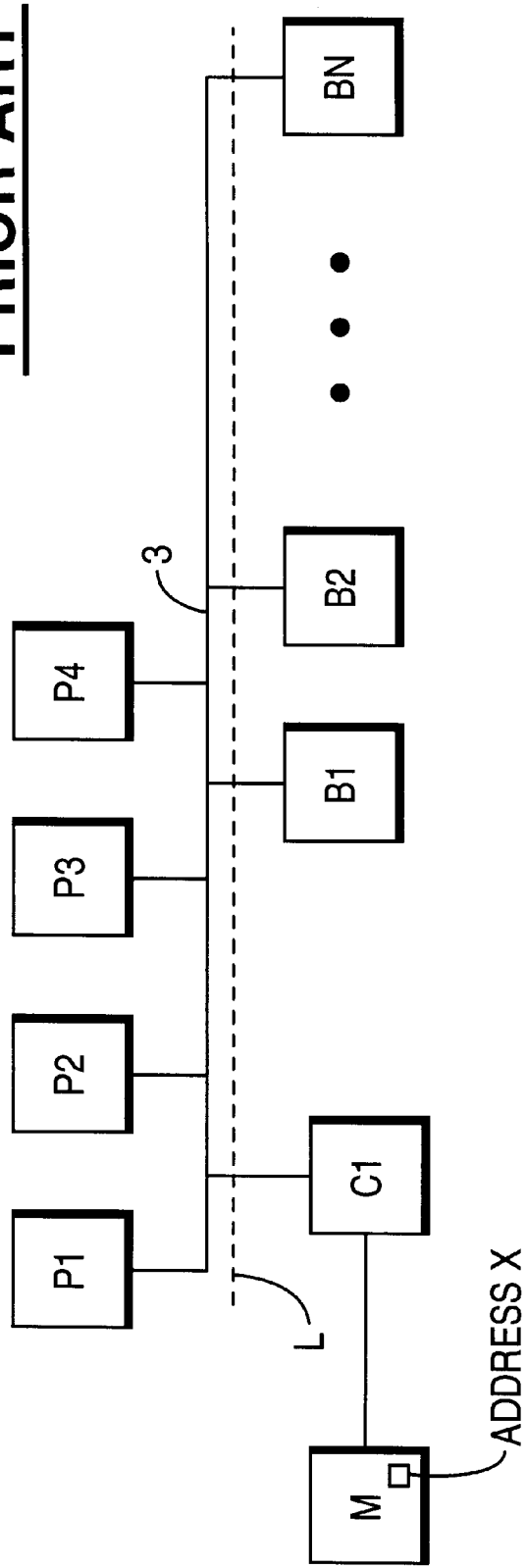
FIG. 1 illustrates a simplified computer architecture, known in the prior art.
Figure 2:
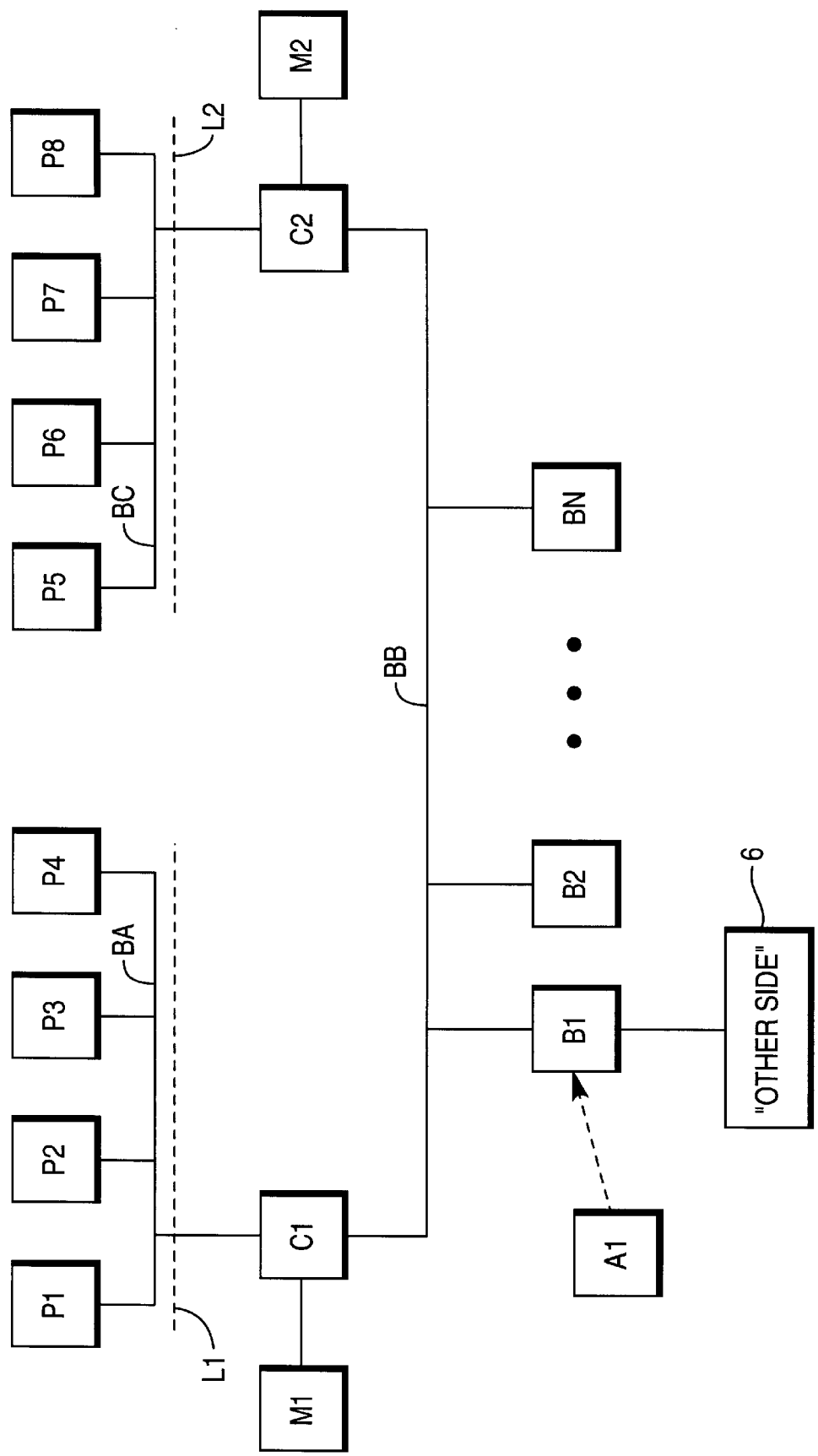
FIG. 2 illustrates a multi-processor, multi-bus computer architecture.
Figure 3:
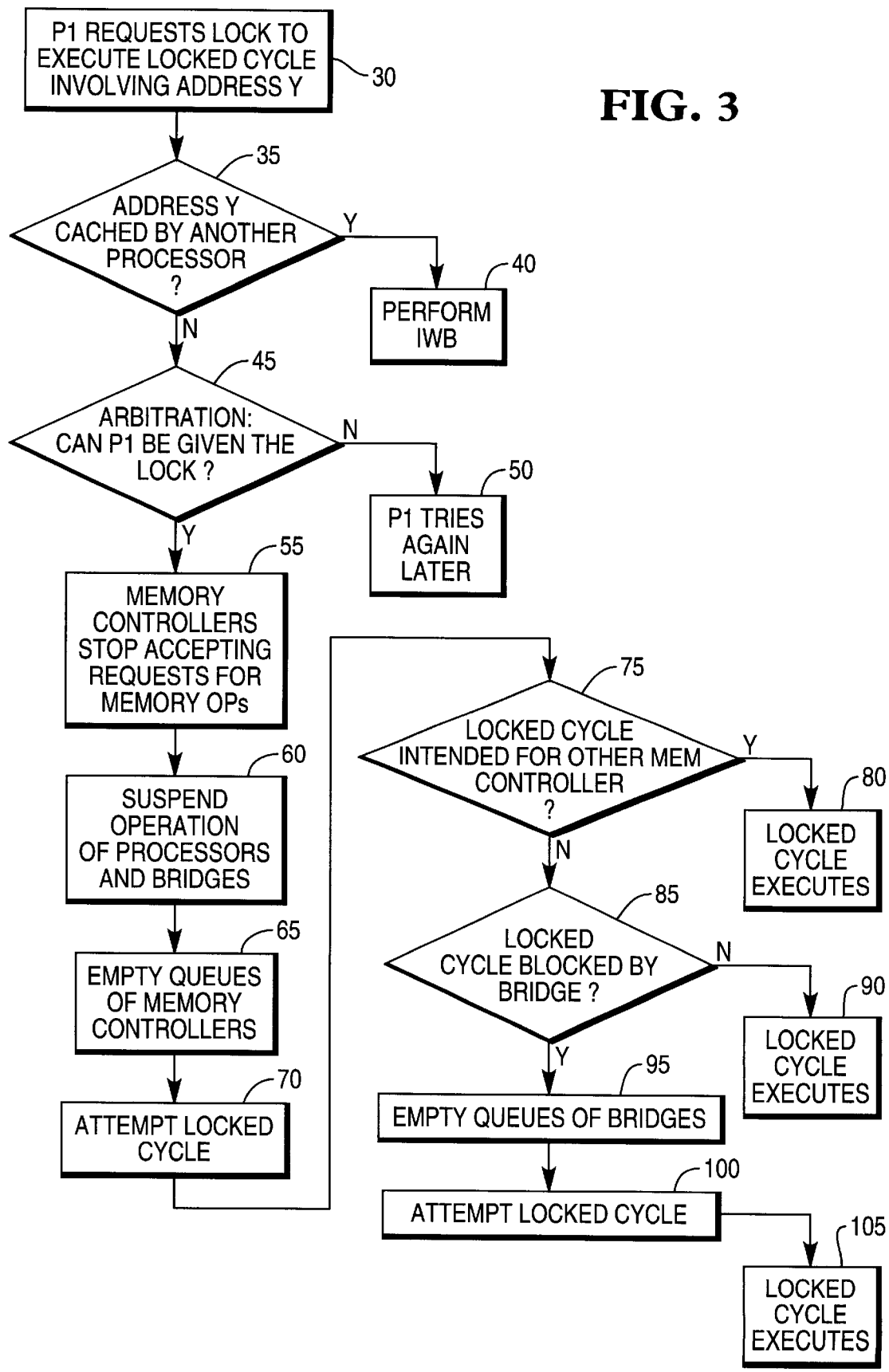
FIG. 3 is a flow chart illustrating logic implemented by the invention.

FIG. 3 is a flow chart of logic implemented by the invention. In block 30, a processor, assumed to be processor P1 in FIG. 2, requests a lock which involves a remote access to address Y, such as through bridge B1. The lock can be requested in connection with a forthcoming locked cycle. The Background of the Invention illustrated a simplified locked cycle.

In decision block 35 in FIG. 3, inquiry is made whether the data at address Y has been cached by another processor. If so, block 40 is reached, and an implicit write-back, IWB, is undertaken, wherein the data within the cache is copied into address Y. (No IWB is undertaken if address Y is located on the "other side" 6 in FIG. 2). Now address Y is consistent with the cache.

If the data at address Y has not been cached by another processor, decision block 45 is reached. Arbitration is imposed, because processor P1 can not necessarily be granted the lock request at this time. One reason why the lock may be denied is that address Y may already be locked in another process, involving another processor.

If processor P1 loses the arbitration, then block 50 is reached. Processor P1 is informed of the denial, and will make the lock request again later.

If processor 1 wins the arbitration, then block 55 is reached. No further requests for memory operations are accepted by the memory controllers, C1 and C2 in FIG. 2. Alternately, since requests for memory operations are queued within the controllers, a marker may be placed at the current end of the queue of every controller. Additional requests are accepted but, as will be seen, their processing will be delayed.

Block 60 is reached in FIG. 3: operation of all processors P and bridges B in FIG. 2 is suspended.

Next, in block 65 in FIG. 3, all presently queued memory requests are processed, in the usual manner, thereby emptying the queues in the memory controllers. If a marker was used, all requests ahead of the marker are emptied.

Block 70 is reached, and the locked cycle is attempted. If, in decision block 75, the locked cycle is found to involve a memory address in another memory controller, the locked cycle executes, as indicated by block 80. The reason is that all queues in the memory controllers were emptied in block 65. After this emptying step, no requests stand in a memory controller which would block the locked cycle.

If, in block 75, it was found that the locked cycle is not intended for another memory controller, decision block 85 is reached, which inquires whether a bridge is blocking the locked cycle. Such blocking can occur if the bridge needed by processor P1 to reach a memory location involved in the locked cycle has already posted a request for another agent, as explained in the Background of the invention.

If no bridge blocks the locked cycle, then block 90 is reached, and the locked cycle executes. If a bridge does block the locked cycle, then, in block 95, all queues in the bridges are emptied of their requests, by processing these requests. Then, in block 100 and 105, the locked cycle is attempted, and succeeds.

Significant Features

1. The Background of the Invention provided an example of a deadlock situation. If a similar situation were to occur during operation of the invention, it would be resolved, and blocks 85 and 95 in FIG. 3 become particularly interesting. The resolution is attained by, in effect, giving precedence to the blocking cycle, which occupies the bridge needed by processor P1.

2. Applicants point out that, if block 80, 90, or 105 is reached, the "locked" cycle executes, but without exerting a true lock. In these three cases, the locked cycle extends beyond the bus BA in FIG. 2 which is lockable by processor P1. Processor cannot lock the busses involved in these three blocks.

For example, if block 80 is reached, memory M2 in FIG. 2 will become involved. However, processor P1 has no access to the lock line L2. But the absence of a true lock does not cause a problem, because all processors and bridges were suspended, in block 60 of FIG. 3. Thus, no agents are operative at the time of P1's locked cycle, to create coherency problems.

In one embodiment, suspension of all processors and bridges may not be required. Suspension of only those which may interfere with the locked cycle can be undertaken.

Figure 4:
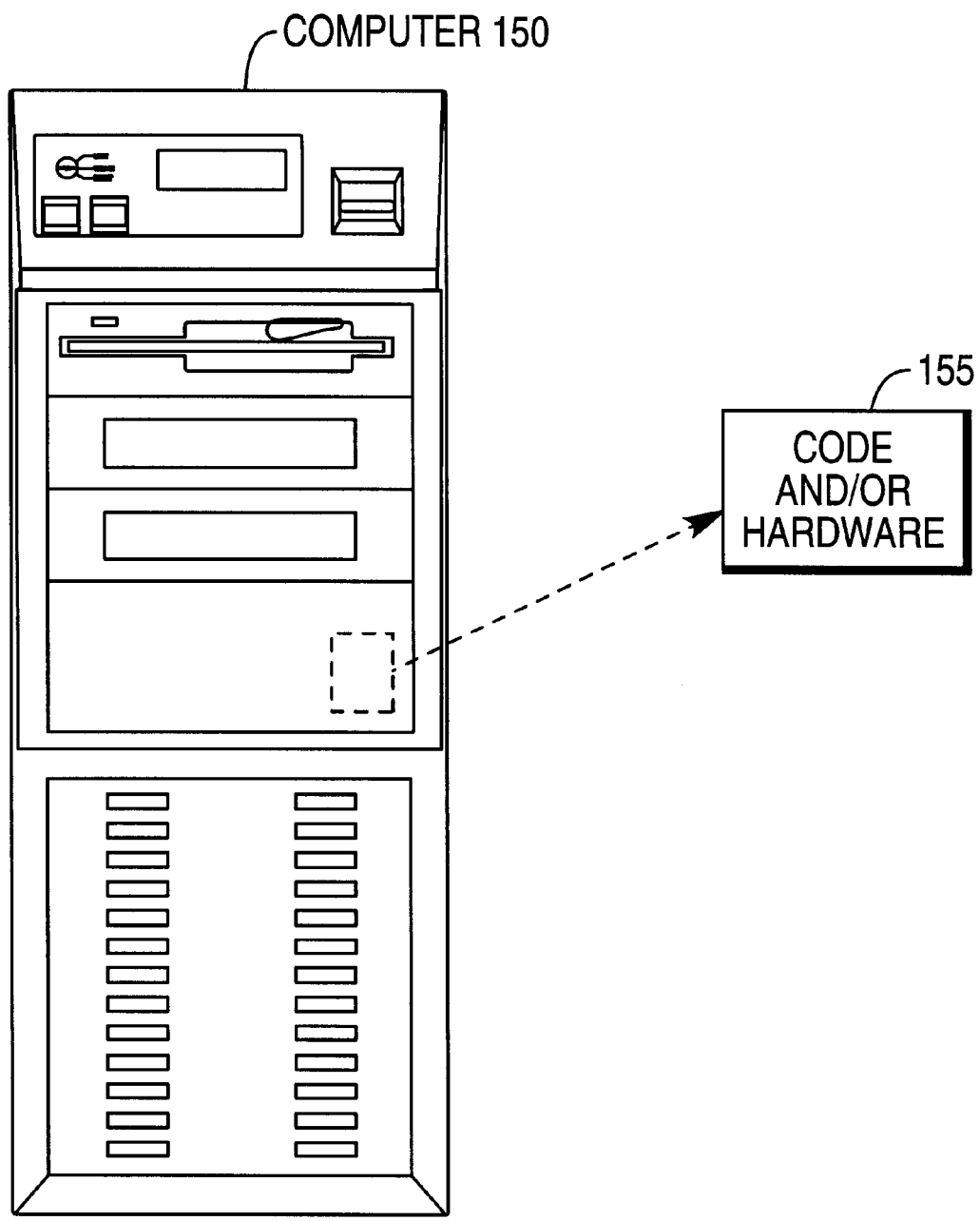
FIG. 4 illustrates one form of the invention.

3. FIG. 4 illustrates one form of the invention. A computer contains module 155, which contains software, hardware, or both, which executes the logic illustrated in FIG. 3, and the other steps described herein.

Pseudo-code which can be used to write code which implements the invention follows. In the pseudo-code, acronyms are used, which are defined as follows:

PBR—Pending Buffer Remote;
IWB—Implicit Writeback;
P6—CPU—Processor 6 CPU (corresponds to P1 in the discussion above);
ALF—Arbitration, Lock, and Flush;
PBE—Processor Bus Engine;
BPRI—High Priority Bus Request;
CPU—Central Processing Unit;
AMC—Memory Controller;
PIRQ—Processor Inbound Request Queue;
IIRQ—I/O Inbound Request Queue;
IOBE—I/O Bus Engine;
IODB—I/O Data Buffer;
PIDB—Processor Inbound Data Buffer;
IrStatus—Inbound Request Status; and
OrStatus—Outbound Request Status.

Pseudo-Code

=Upon detecting a locked remote access, the Pending Buffer Remote (PBR) retries the lock cycle, but captures the cycle being requested.

=If an implicit writeback (IWB) occurs while attempting to retry the lock cycle, the PBR performs the IWB as it would any other IWB and aborts the delayed lock read. According to the P6 bus protocol the P6—CPU will retry the locked sequence even though the initial cycle had an IWB.

=The PBR begins the delayed lock read process by issuing a split lock request to the Arbitration, Lock, and Flush (ALF) logic and requesting the Processor Bus Engine (PBE) to assert BPRI. All delayed lock read accesses use the split lock arbitration logic. The BPRI is asserted to hold off CPU requests until the PBR is ready to allow the CPU to reissue the locked cycle.

=The PBR begins waiting for a split lock arbitration win or lose indication from the ALF logic.

=LOSE: If the ALF signals the PBR lost split lock arbitration, the PBR aborts the delayed lock read. This results in the PBR dropping its split lock arbitration request and signalling the PBE to negate BPRI. Also note that the ALF logic has some fairness logic built in to ensure each AMC would win its fair share of split locks even though the PBR drops its split lock arbitration request when it loses split lock arbitration.

=WIN: If the ALF signals the PBR won split lock arbitration, the PBR begins waiting for the QDRAINED signal from the ALF. While it is waiting, cycles may be pushed into the PIRQ; however, these can be handled normally since the CPU bus is not locked.

=QDRAINED: Once this is detected, all queues in both AMC's are empty and all 10 BUS BRIDGEs are blocked from issuing cycles to the P6_I/O bus. Now the PBR can push the captured lock cycle request into the IIRQ and the cycle is issued to the P6_I/O bus and the IO BUS BRIDGE will respond with either a retry or completion of the cycle.

=IO BUS BRIDGE RETRY: If the IO BUS BRIDGE retries the cycle, the ALF must begin allowing the IO BUS BRIDGEs to access the P6_I/O bus to allow the targeted IO BUS BRIDGE to complete any necessary cycles prior to being able to accept the locked access. Also the I/O Bus Engine (IOBE) must disable its normal IO BUS BRIDGE retry limit counter and retry indefinitely. Timeout protection may be provided. The targeted IO BUS BRIDGE that retries the lock cycle will disable posting. Note that the ALF must allow all IO BUS BRIDGEs access to the P6_I/O bus since the AMC can not determine the targeted IO BUS BRIDGE. This could greatly lengthen the time it takes for the lock cycle to be accepted especially since posting is not disabled in the nontargeted IO BUS BRIDGES. There are no plans to use the MEMREQ/FLUSHREQ signals to force them to disable posting.

=AMC COMPLETE: If the cycle is to the other AMC, it will accept and complete the cycle (it never has to retry the cycle since QDRAINED indicates it has nothing it could collide with). The AMC would then continue handling this the same way as described below in the IO BUS BRIDGE COMPLETE bullet.

=IO BUS BRIDGE COMPLETE: Once the IO BUS BRIDGE completes the cycle the read data is put into the appropriate IODB and the IOBE gives the PBR IrStatus to signal cycle completion. The PBR now signals to negate BPRI to "sync" up with the previously retried lock cycle.

=BPRI NEGATED: The PBR now begins looking for the reissued lock cycle. It will retry all remote cycles (including local cycles requiring MICS) except IWB's which are processed normally.

=ABORT CASES: Aborts cause the PBR to stop processing the delayed locked read and essentially return to "idle" (i.e. signal ALF split lock arbitration is done, release LOCK on the P6_I/O bus, throw away the locked read data, etc.) The following are abort cases:

1) If the original CPU comes back with a different address or a non-lock cycle, (2) If the original CPU does not issue a cycle within Z1 clocks, (3) Z2 abort cases in case this algorithm modified to support non deferred cycles =LOCK REISSUED: PBR returns the normal OrStatus, must NOTpush the cycle into the IIRQ, issues the bus transfer command to move the data from the IODB to the appropriate PIDB. This allows the original lock to complete, finally locking the path from the CPU all the way to the device behind the IO BUS BRIDGE.

=LOCK SEQUENCE: The PBR processes other remote cycles in the locked sequence. Note that unlike the initial remotes access, it does not wait for the IrStatus from the IOBE before providing OrStatus to the PBE. If local accesses occur during this locked sequence, they are handled normally.

Numerous substitutions and modifications can be undertaken without departing from the true spirit and scope of the invention. What is desired to be secured by Letters Patent is the invention as defined in the following claims.

What is claimed is:

1. A method comprising the following steps:
    a) maintaining a multi-bus. multi-processor computer;
    b) ascertaining whether a locked cycle of a predetermined type has been requested by a processor and, if so,
    c) suspending operation of all processors.

2. Method according to claim 1, and further comprising the step of draining queues in memory controllers after suspending operation of the processors.

3. Method according to claim 2, in which all queues in all memory controllers are drained.

4. Method according to claim 2, and further comprising the step of attempting to execute the locked cycle, after draining the queues.

5. Method according to claim 1, wherein bridges connect busses in the computer with other busses, and further comprising the step of suspending operation of all bridges, in response to the request.

6. Method according to claim 5, and further comprising the step of draining queues in memory controllers after suspending operation of the processors.

7. A method of operating a multi-bus, multi-processor computer, wherein bridges connect busses in the computer with other busses, comprising the following steps:
    a) ascertaining whether a locked cycle of a predetermined type has been requested by a processor and, if so,
    b) suspending operation of all processors,
    c) suspending operation of all bridges, in response to the request
    d) draining queues in memory controllers after suspending operation of the processors;
    e) attempting to execute the requested locked cycle after draining the queues; and
    f) if the requested locked cycle requires use of a bridge having a non-empty input queue, then
        i) emptying input queues in all bridges, and then
        ii) executing the locked cycle with assistance of said bridge.

8. A method of operating a multi-bus, multi-processor computer, comprising the following steps:
    a) ascertaining whether a locked cycle of a predetermined type has been requested by a processor and, if so,
    b) suspending operation of all processors and all bridges;
    c) after step (b), emptying queues of memory controllers;
    d) after step (c), ascertaining
        i) whether the requested locked cycle will require involvement of a bridge and, if so,
        ii) whether said bridge is available;
    e) after step (d),
        i) if said bridge is available, executing said requested lock cycle;
        ii) if said bridge is not available, emptying the input queue in said bridge, and then executing said requested locked cycle.

9. In a multi-bus, multi-processor computer, the improvement comprising the following steps:
    a) detecting a request from a requesting processor for a locked cycle which extends beyond a bus lockable by the requesting processor; and
    b) in response to the request, suspending operation of all other processors which can interfere with the locked cycle, while the requesting processor executes to the locked cycle.

10. Improvement according to claim 9, and further comprising the step of terminating suspension of said other processors, after the locked cycle completes.

11. In a multi-bus, multi-processor computer, the improvement comprising:
    a) means for detecting a request for a locked cycle which requires involvement of a bridge; and
    b) means for responding to said request by
        i) suspending operation of other agents in the computer;
        ii) emptying queues in memory controllers; and
        iii) if said bridge is occupied, de-occupying said bridge, for use by said locked cycle.

12. Method according to claim 2, wherein the queues which are drained are drained fully.

13. Method according to claim 3, wherein the queues which are drained are drained fully.

* * * * *